United States Patent

Redfield et al.

[11] Patent Number: 5,488,494
[45] Date of Patent: Jan. 30, 1996

[54] PACKAGING SYSTEM FOR HOLOGRAPHIC STORAGE MEDIA

[75] Inventors: Stephen R. Redfield; Gerald R. Willenbring; John Stockton; Edward A. Halter, all of Austin, Tex.

[73] Assignee: Tamarack Storage Devices, Austin, Tex.

[21] Appl. No.: 133,672

[22] Filed: Oct. 7, 1993

[51] Int. Cl.⁶ ........................................................ G03H 1/26
[52] U.S. Cl. ............................... 359/22; 359/21; 359/28; 359/29; 359/35; 369/103
[58] Field of Search ................................ 359/1, 3, 10, 21, 359/28, 29, 32, 33, 35; 365/215, 216, 234, 235, 124, 125; 369/75.1, 77.1, 77.2, 102, 103, 109; 235/457; 353/103, 114, 116, 118

[56] References Cited

U.S. PATENT DOCUMENTS

| | | |
|---|---|---|
| D. 342,062 | 12/1993 | Martin . |
| 3,600,055 | 8/1971 | Emerick et al. ............................. 359/32 |
| 3,862,357 | 1/1975 | Kanazawa et al. ......................... 359/33 |
| 3,976,354 | 8/1976 | Braitberg et al. ........................... 359/29 |
| 4,006,980 | 2/1977 | Wells ........................................ 353/118 |
| 4,171,864 | 10/1979 | Jung et al. ................................. 359/32 |
| 4,470,083 | 9/1984 | Doering et al. . |
| 4,485,421 | 11/1984 | Hoshino . |
| 4,539,614 | 9/1985 | Thompson . |
| 4,562,498 | 12/1985 | Shibata . |
| 4,626,949 | 12/1986 | Brock et al. . |
| 4,656,542 | 4/1987 | Shibata . |
| 4,686,594 | 8/1987 | Kurafuji . |
| 4,688,124 | 8/1987 | Scribner et al. . |
| 4,737,876 | 4/1988 | Brock et al. . |
| 4,737,877 | 4/1988 | Krongelb et al. . |
| 4,802,718 | 2/1989 | Leib et al. ................................... 359/1 |
| 4,996,120 | 2/1991 | Smothers et al. ............................ 359/3 |
| 5,189,586 | 2/1993 | Rumpza . |
| 5,216,566 | 6/1993 | Obara et al. . |
| 5,218,503 | 6/1993 | Martin . |
| 5,226,035 | 7/1993 | Kato . |
| 5,233,494 | 8/1993 | Kikuchi . |
| 5,237,845 | 8/1993 | Kikuchi . |
| 5,247,417 | 9/1993 | Ambur et al. . |
| 5,249,177 | 9/1993 | Kamakura et al. . |
| 5,255,145 | 10/1993 | Ambur et al. . |
| 5,260,931 | 11/1993 | Sasaki et al. . |
| 5,262,917 | 11/1993 | Kikuchi et al. . |
| 5,276,675 | 1/1994 | Wanger et al. . |
| 5,280,403 | 1/1994 | Martin . |
| 5,293,294 | 3/1994 | Chappell . |
| 5,297,133 | 3/1994 | Otsuka et al. . |
| 5,299,078 | 4/1994 | Mabuchi . |
| 5,317,554 | 5/1994 | Taylor et al. ............................ 369/77.2 |

Primary Examiner—Martin Lerner
Assistant Examiner—Darren E. Schuberg
Attorney, Agent, or Firm—Gregory M. Howison

[57] ABSTRACT

A package for a holographic storage media (10) is provided that utilizes a slide tray (43) for containing a plurality of slides (102). Each of the slides (102) is comprised of an opaque casing (110), which is operable to hold a sandwich structure (120). The sandwich structure (120) has a gripping mechanism (122) disposed on the edge thereof for allowing the structure (120) to be reciprocated within the jacket (110) for extraction thereof and reinsertion thereof. A gripping arm (156) is operable to attach to a gripping member (124) on a gripping mechanism (122) attached to the slide (102) to extract the slide (102) and place it into a holder (148). The holder (148) is then operable to receive the slide (102) and dispose it in a holographic storage system. The slide (102) can then be written to by interfering a data beam and a reference beam in a predetermined storage location (54) and then the slide again placed into the jacket (110).

25 Claims, 6 Drawing Sheets

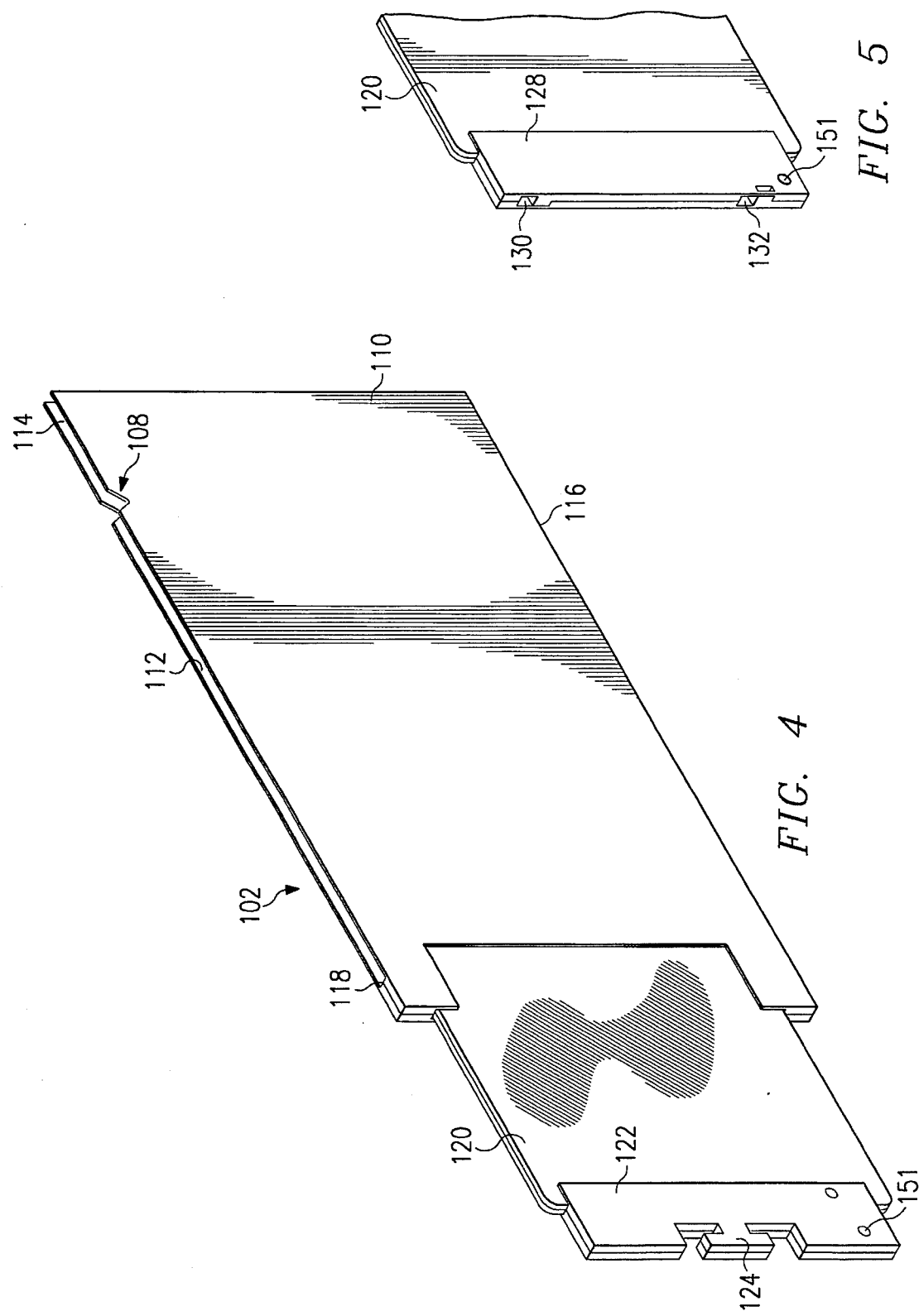

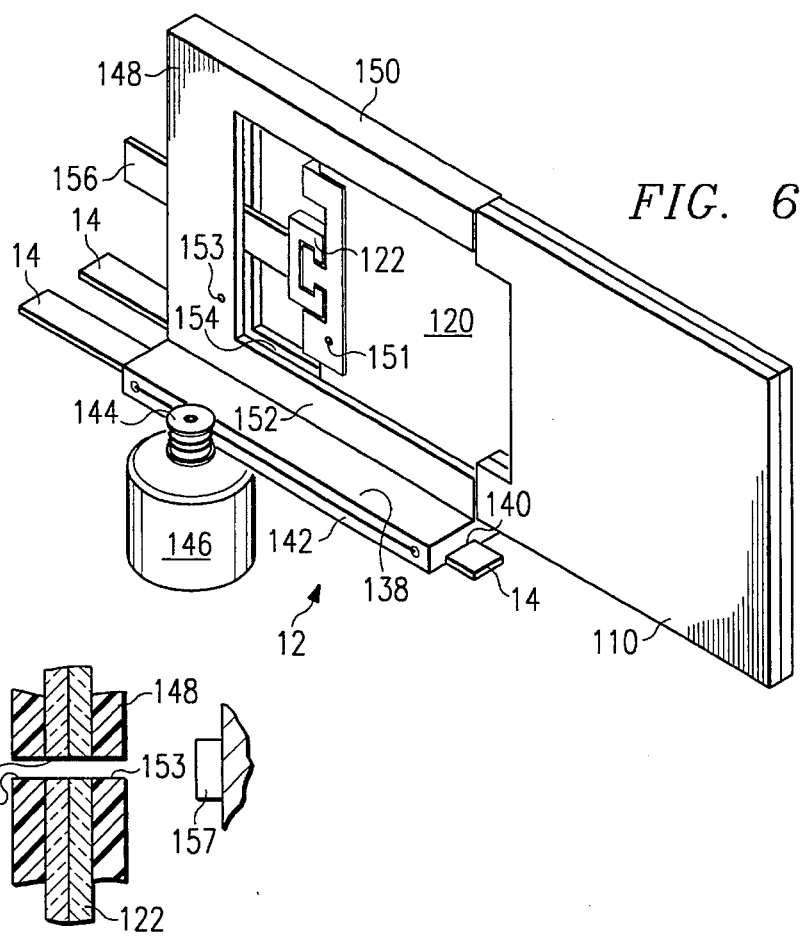
FIG. 6
FIG. 6a
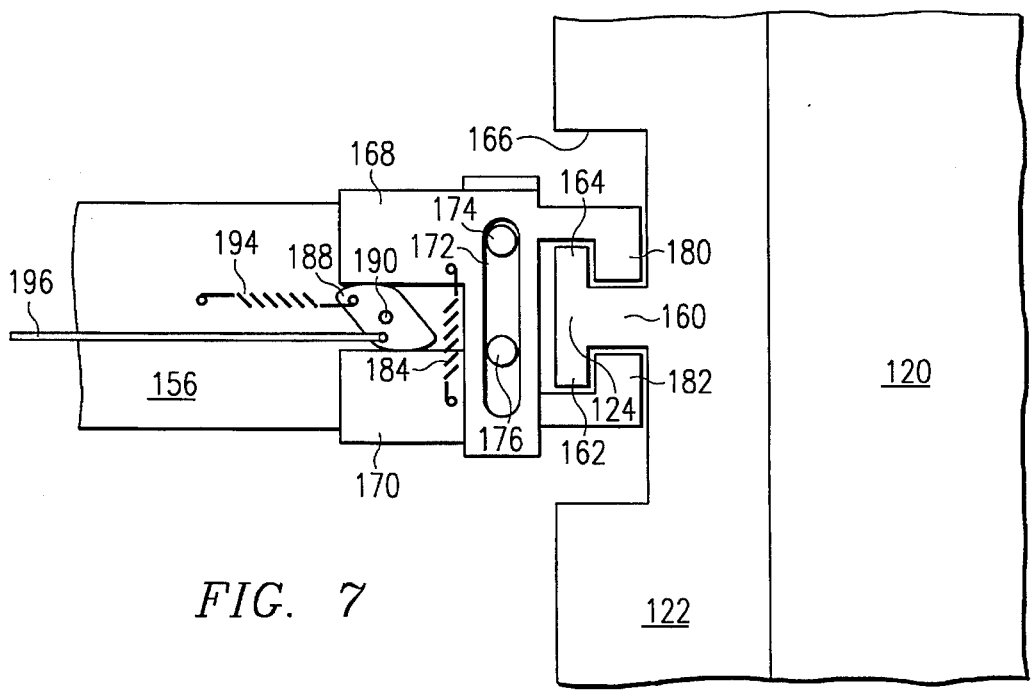
FIG. 7

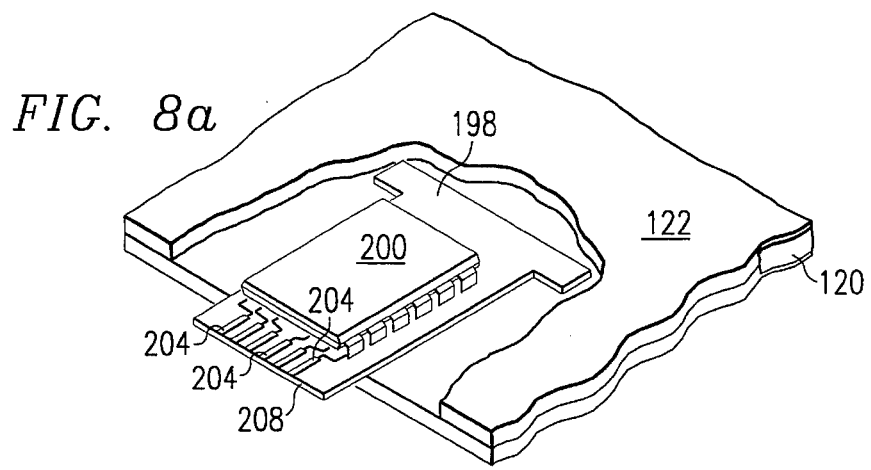
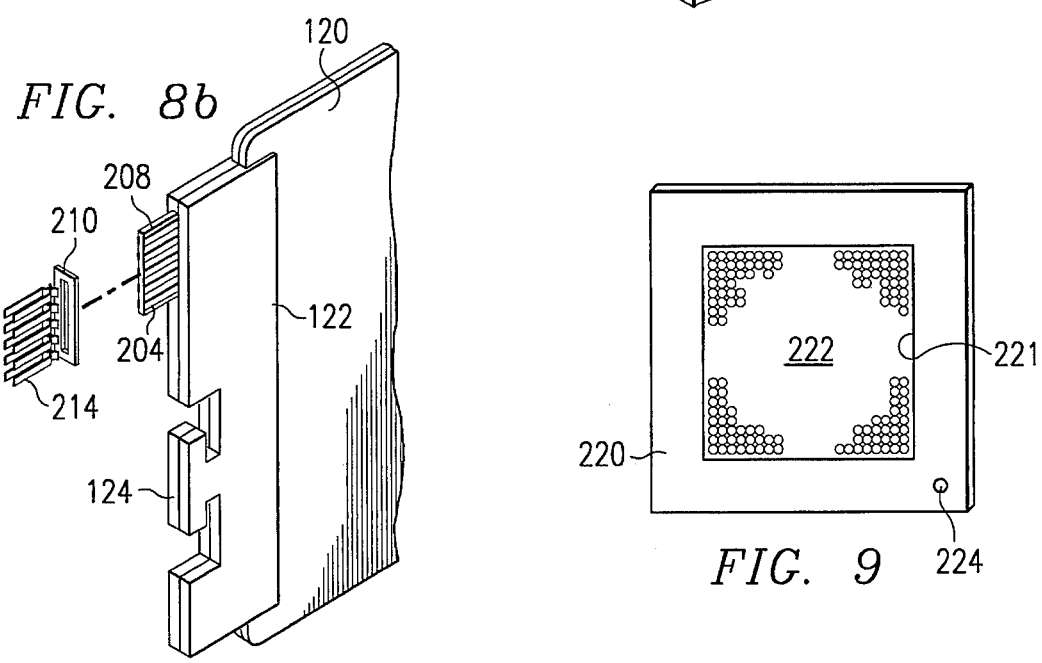
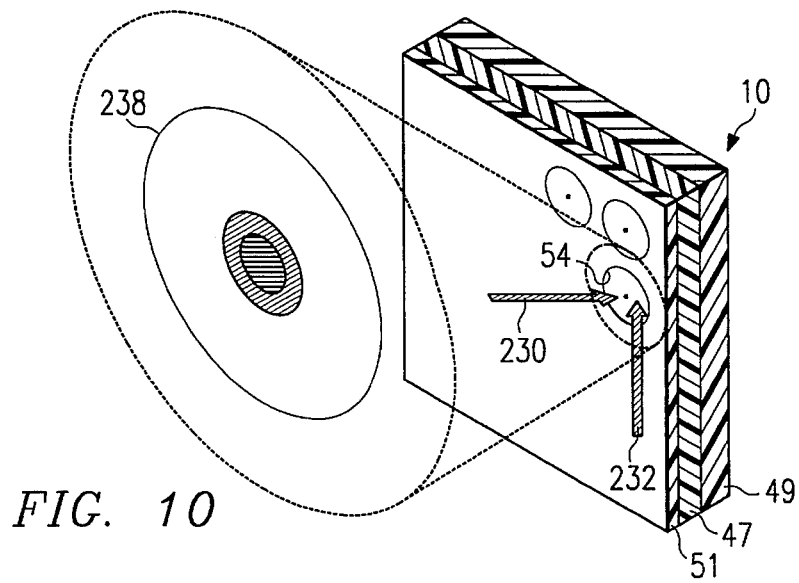

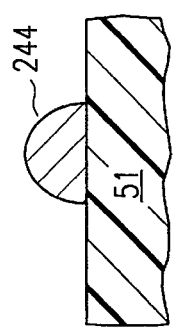
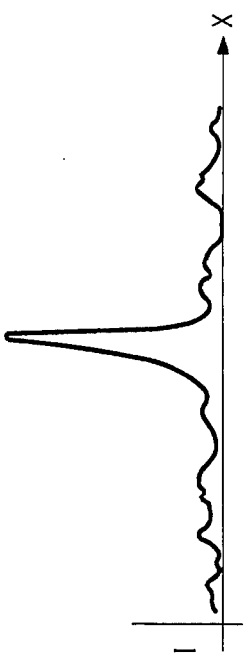
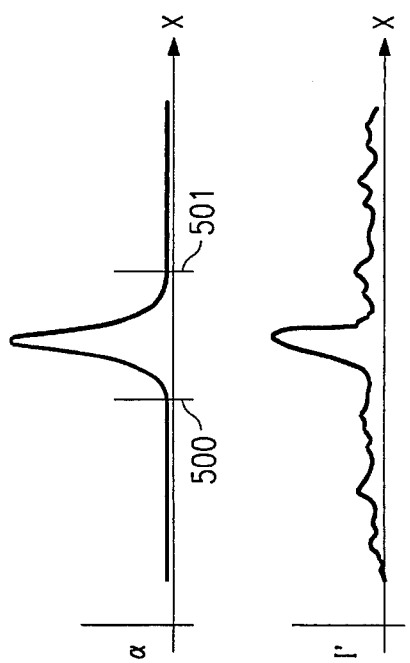
FIG. 11d
FIG. 12a
FIG. 12b
FIG. 12c
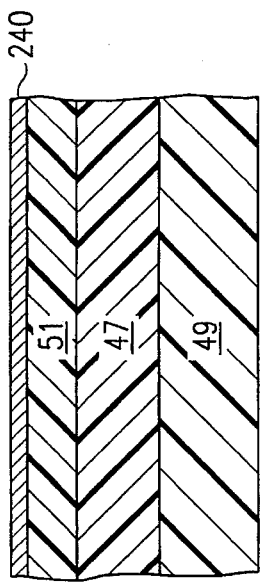
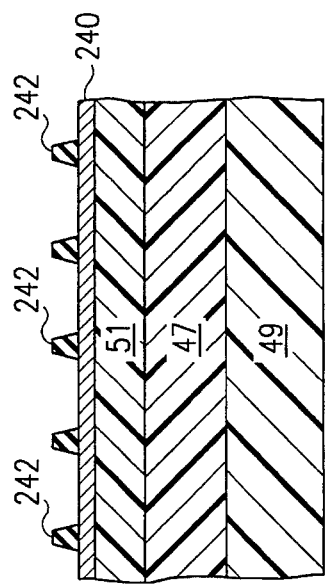
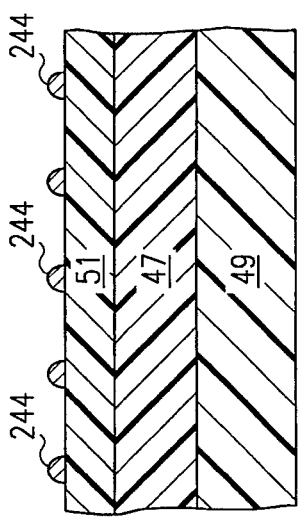
FIG. 11a
FIG. 11b
FIG. 11c

PACKAGING SYSTEM FOR HOLOGRAPHIC STORAGE MEDIA

TECHNICAL FIELD OF THE INVENTION

The present invention pertains in general to holographic storage systems, and more particularly, to a packaging system for holding a holographic storage media.

CROSS-REFERENCE TO RELATED APPLICATIONS

This application is related to U.S. patent application No. 08/091,311, filed Jul. 14, 1993, and entitled "Method and Apparatus for Isolating Data Storage Regions in a Thick Holographic Storage Media" (Atty. Dkt. No. TAMA-21,889), U.S. patent application No. 08/091,620, filed Jul. 14, 1993, and entitled "Method and Apparatus for Isolating Data Storage Regions in a Thin Holographic Storage Media" (Atty. Dkt. No. TAMA-21,817) and U.S. patent application No. 08/110,139, filed Aug. 20, 1993, and entitled "Method and Apparatus for Phase Encoding Data Storage Regions in a Thin Holographic Storage Media" (Arty. Dkt. No. TAMA-21,875).

BACKGROUND OF THE INVENTION

As the need for increased data storage changes, the search for higher density, faster access memory technologies also increases. One of these, holographic data storage, provides the promise for increased access to higher density data. The techniques for realizing such storage typically utilize some type of storage media, such as photorefractive crystals or photopolymer layers, to store 3-D "stacks" of data in the form of pages of data. Typically, coherent light beams from lasers are utilized to perform the addressing, writing and reading of the data from the storage media by directing these beams at a specific region on the surface of the media. Writing is achieved by remembering the interference pattern formed by these beams at this region. Reading is achieved by detecting a reconstructed light beam as it exits the storage media, the data then being extracted therefrom. Addressing is achieved by the positioning of the laser beams, and this is typically done through the mechanical movement of mirrors or lenses; however, the storage media itself can be moved relative to fixed laser beams.

Heretofore, when utilizing a holographic storage media, it is typically secured in a more or less permanent fashion to a mounting structure which either has some type of positioning mechanism that allows the media to be positioned, or is fixed wherein the optics determines the position. The disadvantage to this is that the layout of the system is such that the media is not easily accessible for replacement thereof. It is desirable that holographic storage medias utilizing a photopolymer material, and therefore operate as a Write-Once Read-Many (WORM) media, be designed to be "removable" and "portable" similar to a floppy disk. As such, they must be contained in some type of carrier, which carrier can be removed. However, design of this carder is not straightforward, as it must provide structural stability, not add significantly to the media package, give the media protection and isolate the media from premature exposure. There is also a desire to provide for some type of fiduciary marking to provide position information and possibly make some provision for containing information as to usage history. Present media do not provide for this.

SUMMARY OF THE INVENTION

The present invention disclosed and claimed herein comprises a package structure for a holographic storage media. The package structure includes an optically transmissive substrate over which a media layer of photosensitive photopolymer material disposed. An optically transmissive capping layer is then disposed on the media layer opposite the substrate. The substrate, the media layer and the capping layer comprise a slide. The slide is provided with some type of handle. An opaque jacket is provided for containing the slide with one end open to allow the slide to be removed therefrom for reading of information therefrom and writing of information thereto. The opening is also operable to receive the slide for insertion therein.

In one aspect of the present invention, the slide has disposed on one edge thereof proximate to the open end of the case a gripping member integral with the handle. This gripping member is operable to be interfaced with an external slide retrieval system which can remove the slide from the case and insert the slide back into the case through the opening. A plurality of slides can be provided, each in their own case and disposed in a slide tray. The slide tray is operable to have a retaining mechanism associated therewith that retains the slide cases within the slide tray such that the slides can be removed therefrom without movement of the case.

In another aspect of the present invention, a holographic storage system is provided for interfacing with the slide for the purpose of storing or retrieving data to/from the slide. The holographic storage system includes a beam generation system for generating a data beam and a reference beam, the data beam having a data image encoded therein. A slide holder is provided which interfaces with a slide retrieval system that can retrieve the slide from the case and dispose it on the slide holder and remove the slide from the slide holder and dispose it in a slide case. A beam positioning system positions the data beam and reference beam onto a select storage location on the slide when the slide is disposed on the holder. A detection device is operable to detect data from a reconstructed data beam during a playback operation. The holographic storage system is controlled by a system controller to control the beam positioning system to position the data beam and reference beam to the select location in response to receiving an external address signal. The data beam and reference beam are generated by the beam generation system during a record operation during which only the reference beam is generated during a playback operation. During the playback operation, a recorded data beam is generated for detection by a detection device.

In a further aspect of the present invention, the beam positioning system is operable to move the slide holder along at least one axis of the slide. Further, the beam positioning system includes beam positioning optics for positioning the data beam and reference beam along at least another axis of the slide. A fiduciary mark or set of marks is provided on each of the slides which can be sensed by the slide retrieval system such that the slide holder and slide are positioned relative to the beam positioning system to provide a positioning reference therefor.

In a yet further aspect of the present invention, each of the slides has a masked layer disposed thereon. The masked layer is comprised of a plurality of absorption masks, one for each of the storage locations. Each of the masks is disposed over the storage location between the storage location and the data beams and reference beams. Each of the masks has a predetermined absorption profile to absorb select regions of impinging light onto the storage regions. In the preferred embodiment, a high absorption region is disposed at substantially the center of the storage location to absorb the DC component of a Fourier transform of the data image that is to be stored in the storage location.

In an even further aspect of the invention, a non-volatile memory is integrally mounted to the slide. This can be an integrated circuit, such as an EPROM. The EPROM is operable to have exposure and/or usage history stored therein that is unique to the associated slide. When the slide is selected, the EPROM is also interfaced with.

BRIEF DESCRIPTION OF THE DRAWINGS

For a more complete understanding of the present invention and the advantages thereof, reference is now made to the following description taken in conjunction with the accompanying Drawings in which:

FIG. 4 illustrates a detail of the slide and the case therefore;

FIG. 5 illustrates an alternate embodiment of the slide of FIG. 4;

FIG. 6 illustrates a detail of a mechanism for accomplishing the picking action;

FIG. 6a illustrates a detail of a fiduciary mark alignment approach;

FIG. 7 illustrates a detail of a picking mechanism;

FIGS. 8a and 8b illustrate a detail of an embodiment of exposure and usage information retention on the slide utilizing a non-volatile memory integral with the slide;

FIG. 9 illustrates an alternate embodiment of the slides;

FIG. 10 illustrates a masking technique for controlling exposure patterns for the slide;

FIGS. 11a–11d illustrate a cross-sectional diagram of the media depicting the steps in the process of forming the mask layer of FIG. 10; and FIGS. 12a–12c illustrate a plot of the Fourier transform after masking by the mask layer of FIG. 10.

DETAILED DESCRIPTION OF THE INVENTION

Figure 1:
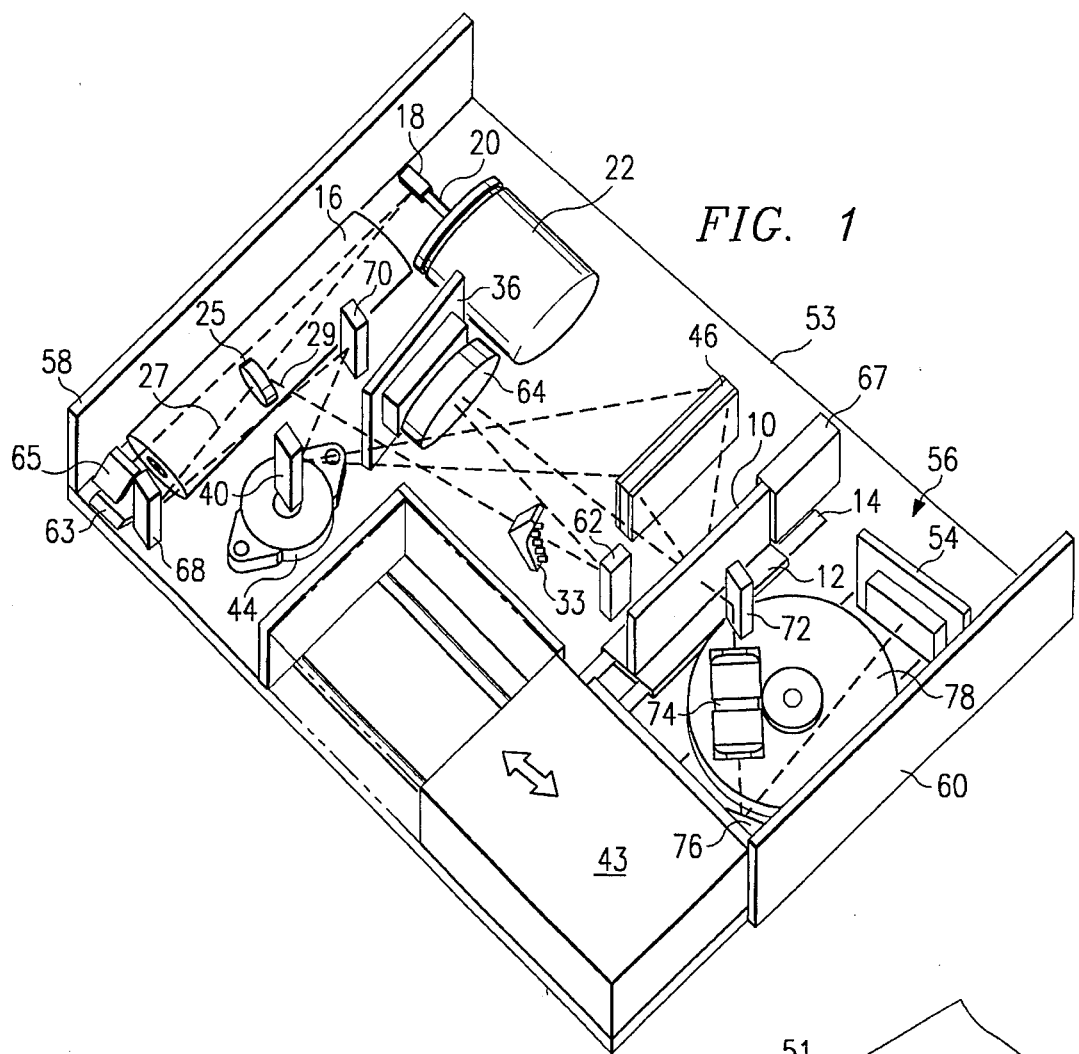
FIG. 1 illustrates a perspective view of the holographic storage system utilizing the packaging technique of the present invention.

Referring now to FIG. 1, there is illustrated a layout for the preferred embodiment which is a compact holographic storage system for recording data on and retrieving data from a holographic storage media 10. As will be described hereinbelow, holographic storage media 10 is a structure formed from a photopolymer material. The system of FIG. 1 is constructed to fit within a standard 5¼" disk form factor and provide for a relatively large recording window on the order of 2"×2" in the holographic storage media 10. The holographic storage media 10 is in the form of a slide such that it can accommodate a removable storage media. The storage media 10 is disposed within a carder 12, the carrier 12 operable to be inserted into the system on a slide 14.

In this embodiment, optical components are disposed in a housing 56 having a front edge 58 and a rear edge 60. A laser 16 is provided, which can be comprised of, for example, a laser diode with a power output of around 30 milliwatts, with a wavelength in the range of 680 nanometers. The laser 16 is disposed proximate and parallel to the front edge 58. The output of laser 16 is redirected to the surface of a reflective surface 18 via two mirrors 63 and 65. The two mirrors 63 and 65 are disposed at a 45° angle with respect to each other such that the beam is directed outward from the surface 63 up to the surface 65 and then above the laser 16 along the longitudinal axis thereof to the reflective surface 18.

The reflective surface 18 is connected via a shaft 20 to a stepper motor 22. The stepper motor 22 is operable to provide positioning along the y-axis and therefore is referred to as the y-stepper motor 22. The new beam is then reflected off of the surface 18 and directed towards a beam splitter 25. The beam splitter 25 divides the beam into a data beam 29 and a reference beam 27. The data beam 28, as will be described hereinbelow, is operable to have data superimposed thereon. The reference beam 27 is operable, during a record operation, to be directed toward an interfering condition with the data beam 29 and, during the playback operation, to be directed at a predetermined storage location on the surface of the storage media 10.

The data beam 29 is directed by the surface 18 toward a specific lens in a lens array 33 which is comprised of a plurality of GRIN rods, which are cylindrical rods that are operable to expand the data beam and direct it toward a reflective surface 62, which then directs it to a collimating/transform lens 64. The lens (>4 collimates the light and directs it to a reflective spatial light modulator (SLM) 36. The SLM 36 is an array of elements, each representing a bit of information. The data is arranged in a "page" of data on a grid of, for example, 256×256 bits. Each of the bits is comprised of a rectangular image called a pixel that is either black or white. The SLM 36 in the embodiment of FIG. 1 is illustrated as a "reflective" polarization rotating SLM and, therefore, when light is reflected from an element, if the polarization of the light is not rotated, it is passed by an analyzer and is a "white" image and, whenever the polarization of the light is rotated during reflection off a pixel, this is not passed and is a "black" image. This represents the two binary states.

Upon reflection from and data modulation by the SLM 36, the data beam again passes through a lens 64. In the first pass through lens 64, it collimated the light striking the SLM 36 and, in the second pass through lens 64, the lens 64 acts as a transform lens. In effect, the transform lens 64 is operable to convert the expanded beam from the reflective surface 62 and the array 33 into a parallel beam that will impinge on the entire surface of the SLM 36. The reflected beam from the SLM 36 is then again focused by the lens 64 onto a specific storage location on the surface of the storage media 10 as the Fourier transform of the data image.

The reference beam 27 is directed toward a first reflective surface 68 for reflection to a second reflective surface 70. The reflective surface 70 again redirects the reference beam 27 toward a reflective surface 40 which is longitudinal in shape and is connected through a shaft 42 to a stepper motor 44. The reflective surface 40 provides for angle multiplexing of multiple pages at a given stack and is operable to direct the angle multiplexed reference beam 27 at a predetermined angle to a Holographic Optical Element (HOE) 46, which is operable to direct each of the reference beam paths as a redirected reference beam 48 to a given location on the surface of the storage media 10. It can be seen that the angle of the redirected reference beams 48 is a function of the stepper motor 44, and the angle which is imposed thereon by the reflective surface 40.

During a record operation in a given storage location in a holographic storage media 10, the reference beams are separated by a Bragg angle such that the images can be discriminated. Therefore, during the record operation, the y-stepper motor 22 positions the reflective surface 18 at one position which results in the data beam being reddirected to a given storage location on the surface of the recording media 10. Data is then imposed on the data beam by the SLM 36 and then the stepper motor 44 positioned at a first angle. This will result in storage of that page of information onto the storage location. Thereafter, the SLM 36 is controlled to superimpose another page of information onto the data beam and then the stepper motor 44 "steps" to a different angle to record this new page of information in the same storage location. Each of these record operations is the result of the interference between the redirected reference beam 48 at a particular angle and the data beam. This results in the storage of an interference grating at that storage location. Each page is comprised of an interference grating, these interference gratings being overlapping within a storage region. Since each interference grating was stored by the interference of a data beam and a reference beam at a different angle, the reconstruction operation merely requires that a reference beam be redirected to the storage location at the angle at which the interference grating was stored.

During the data reconstruction operation, the reconstructed image is reflected from a surface 72 to an imaging lens 74, which is operable to then focus the expanded image onto a detector 54 via a reflecting surface 76.

A stack stepper motor 78 is provided proximate to the imaging lens 74 and the reflecting surface 72. The stepper motor 78 is operable to control the carrier 12 and move it in a reciprocal motion along the slide 14 to provide for the positioning of the stack and allows a new column of storage locations to be selected on the surface of the media 10. Additionally, it can be seen that each of the reflective surfaces is substantially conforming to the shape of a column, i.e., longitudinal in shape. It is therefore only necessary to control the y-stepper motor 22 in such a manner to move the beam along the longitudinal axis of each of the reflective surfaces in order to move it along the longitudinal axis of column defined on the surface of the storage media 10.

The media 10 is operable to be retrieved from a slide tray 43 which is operable to hold a plurality of slides, the slides containing the media 10. Although illustrated as completely separated from the slide tray 43, it should be understood that a picking mechanism 67 is utilized to extract the media 10 from the slide tray 43 and then to reinsert therein in order to retrieve another slide. The slide tray 43 is operable to slide laterally along a platform 53. This will be described in more detail hereinbelow.

Figure 1A:
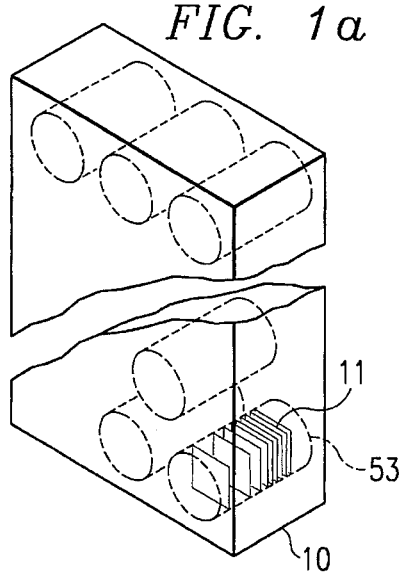
FIG. 1a illustrates a detail of the recording media showing recording placement strategy.

Referring now to FIG. 1a, there is illustrated a perspective view of a holographic storage media 10. As described above, the holographic storage media can be divided into storage regions, which are illustrated by storage regions 53, each of which comprises a stack. Each of these stacks or storage regions 53 are separated by a predetermined distance and each operable to store a plurality of pages of information, each of these pages of information represented by an interference grating. Each of the stacks 53 are separated by a predetermined distance and organized in an array.

Figure 2:
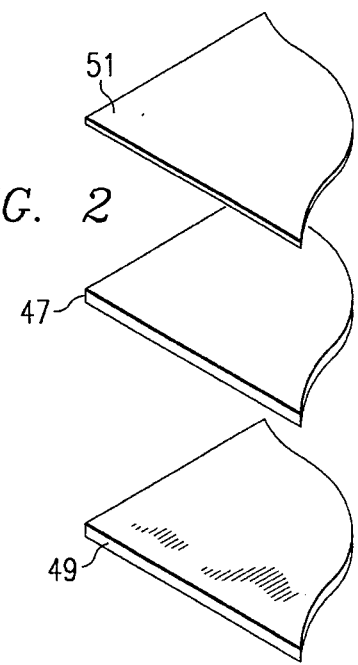
FIG. 2 illustrates an exploded view of the storage media

Referring now to FIG. 2, there is illustrated an exploded view of one embodiment of the storage media 10. The storage media of FIG. 2 utilizes a photopolymer, which photopolymer is a material that undergoes photo-induced polymerization. These compositions have been used to form conventional holograms. These are typically fabricated from a viscous or gelatin-like composition which is photo-reactive. When two laser beams intersect in this composition to set up an interference pattern, this causes selective polymerization within the material. These compositions typically contain a polymeric binder, a liquid ethylinically unsaturated monomer and a photoinitiator system. Typically, the layer 47 of viscous or gelatin-like recording material is spun or web coated onto a substrate 49 such as glass to provide a thin coating of approximately 20 microns. A capping layer 51 of material such as Mylar® is then disposed over the gelatin layer. This provides a relatively good optical surface on the upper surface of the gelatin layer, and the glass substrate provides a high quality optical surface on the bottom surface of the gelatin-like recording layer.

Figure 3A:
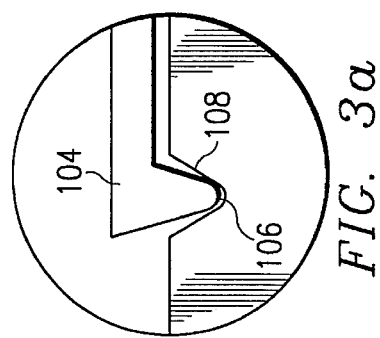
FIG. 3a illustrates a detail of the securing mechanism.
Figure 3:
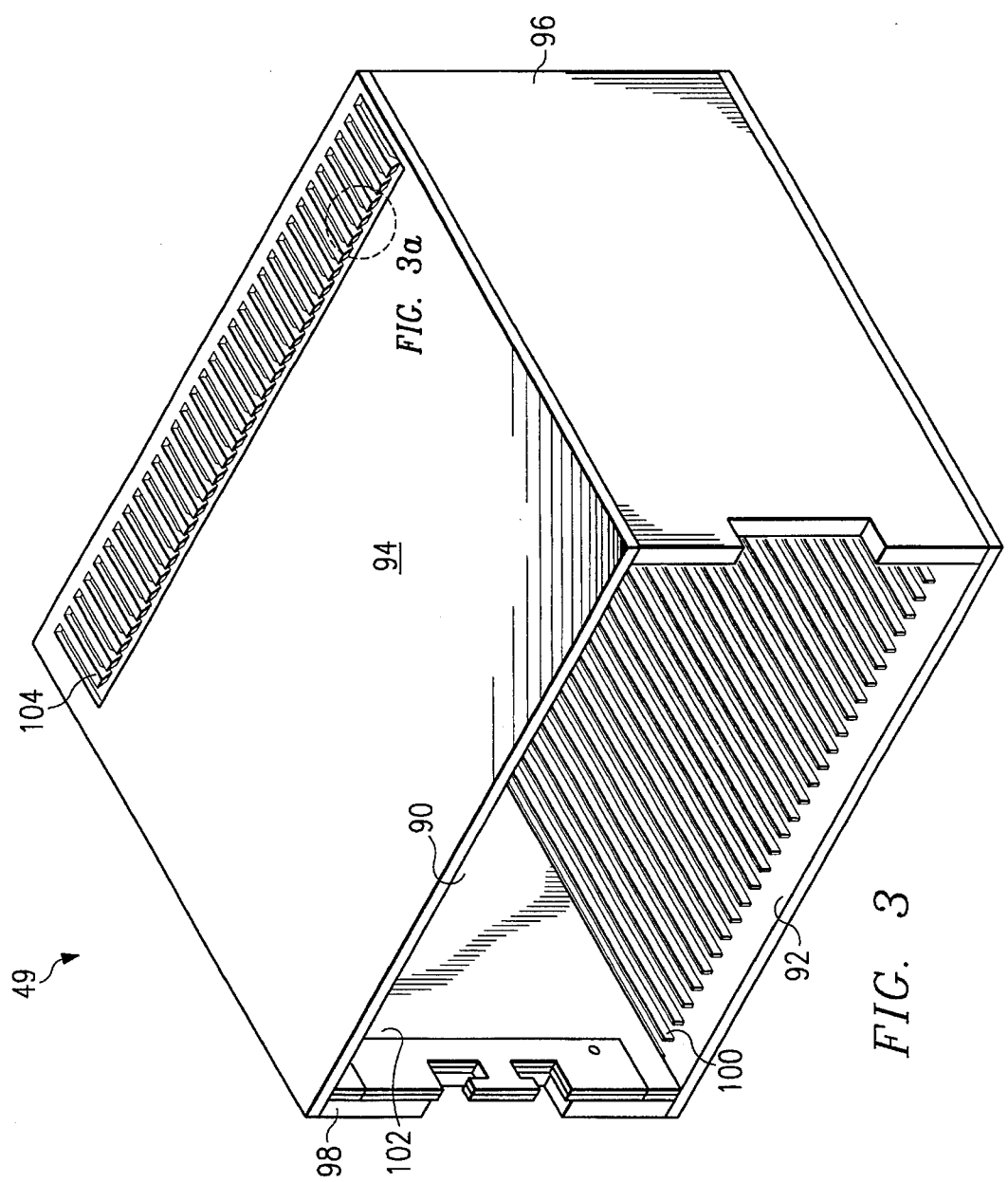
FIG. 3 illustrates a perspective view of the slide tray.

Referring now to FIG. 3, there is illustrated a detail of the slide tray 43. The slide tray 43 is comprised of a rectangular box having an open end 90, a bottom 92, a top 94 and two sides 96 and 98, the rear not shown. The bottom 92 and top 94 have rails 100 disposed on the surface thereof, the rails on the top 94 not shown. The rails 100 are operable to guide a plurality of slides 102 into the slide tray 43 and provide spacing therefor, only one slide 102 shown in the slide tray 43. The slides 102 are operable to be inserted into the slide tray 43 and be attached by a plurality of flexible locking mechanisms 104, disposed along the rear portion of the top surface 94. A detail of the locking mechanisms 104 is illustrated in FIG. 3a. Each of the locking mechanisms 104 is flexible and has disposed upon the end thereof a downward protrusion 106. The downward protrusion is operable to interface with a detent 108 on the edge of the slide 102. Therefore, the slide 102 can be inserted into the slide tray 43 along the rail 100 until the protrusion 106 is forced downward into the detent 108 to provide a locking operation therefor.

Referring now to FIG. 4, there is illustrated a detail of the slide 102. The slide 102 is comprised of an optically opaque jacket 110 that has a slot 112 disposed in an upper edge 114 and also in a lower edge 116 (not shown). The slot 112 is operable to interface with the rails in a respective one of the bottom surface 92 and top surface 94. The slot 112 extends all the way from the rear of the jacket 110 to a stop 118 at the forwardmost portion of the edge 114 and the edge 116. The stop 118 is operable to interface with the forwardmost rail of the edge 100 to determine the distance to which the slide 102 can be inserted into the opening 90. The detent 108 is disposed in the upper edge 114.

The holographic storage media is comprised of a sandwich structure 120 that is disposed in the jacket 110. The forwardmost portion of the sandwich structure 120 has a gripping mechanism or handle 122 disposed thereon. The gripping mechanism 122 has a gripping member 124 integrally formed therewith. The gripping member 124 allows a gripping arm (not shown) to attach thereto and reciprocate the sandwich structure 120 within the jacket 110. The holographic storage media utilized for the sandwich structure 120 is a photopolymer material. The sandwich structure 120 is illustrated in detail in FIG. 2, as described hereinabove. Since this is a photosensitive material in its unrecorded state, it is important that the holographic storage media is protected from illumination by external light sources prior to all of the storage regions therein having information recorded therein. This could degrade the capacity of the storage media 120. Therefore, by providing an opaque jacket, such as the jacket 110, the sandwich structure 120 can be protected during handling. Further, although not described hereinabove, the jacket of FIG. 1 is relatively opaque, such that when the slide is removed from the jacket 110, extraneous light does not exist within the jacket.

Referring now to FIG. 5, there is illustrated an alternate embodiment of the slide structure of FIG. 4 with a different gripping mechanism 128. The gripping mechanism 128 is disposed on the sandwich structure 120, as described above with respect to FIG. 4. The gripping member 124 of FIG. 4 is an indented protrusion which would be gripped by an external gripping arm. By comparison, the gripping mechanism 128 has two gripping slots 130 and 132, which will allow two gripping arms to be inserted therein for retraction of the slide from the jacket 110.

Referring now to FIG. 6, there is illustrated a detail of a possible embodiment of the slide carrier 12 and the interaction thereof with the jacket 110 for the slide. The slide carder 12 is comprised of a base 138, which has two slots 140 disposed on the undersurface thereof. The base 138 is operable to reciprocated along the rails 14, the rails 14 fitting into the slots 140. Although not illustrated, the slot 140 has rollers associated therewith to reduce the friction of the reciprocating action of the base 138 on the rails 14. A band 142 is comprised of two parts attached to opposite ends on one side of the base 138 and is operable to interface with a driving cylinder 144. The band 144 has each part thereof wound about the driving cylinder 144 in opposite directions such that when the cylinder rotates in one direction, one part of the band winds onto the cylinder 144 and the other part unwinds from the cylinder 144. This reciprocates the base 138. The driving cylinder 144 is controlled by a stepper motor 146 to select the position thereof.

An upright slide support member 148 is disposed on the base 138 and has an upper guide member 150 and a lower guide member 152 for receiving the slide from the jacket 110. The support member 148 with extensions that are the guide members 150 and 152 comprise the carrier 12. The slide moves into an inserted position relative to the carder, and out of the inserted position by reciprocating in a groove 154 within the upper guide member 150 and lower guide member 152. A gripping member 156 is operable to be inserted from the rear of the support member 148 such that it can interface with the gripping mechanism 122 and retrieve a slide from the jacket 110 and, alternately, set it back into the jacket 110. The slide, once removed from the jacket 110 is locked into the support member 148. Thereafter, the base 138 can be reciprocated along the rails 14.

In operation, the slide jacket 110 is initially disposed in the slide tray 43 and then the most distal ends of the upper guide member 150 and lower guide member 152 abutted up against the jacket 110 after a select one of the jackets 110 is brought into alignment therewith by moving the slide tray 43 back and forth. This positioning of the slide jacket 110 is effected with the motor 146, band 142 and driving cylinder 144. A gripping member 156 is then reciprocated toward the gripping mechanism 122 such that the slide can be extracted from the jacket 110 and locked into the support member 148. After locking therein, the base 138 is then reciprocated along the rails 14 into position such that a column of storage locations is disposed within the optical path of both the reference beam and the data beam, as described hereinabove with respect to FIG. 1.

It should be noted that this is just one possible embodiment and the configuration could be such that the storage media itself, in the form of a slide, is stationary once locked into the support member 148, and the optics provide all positioning in both the x- and the y-axis. Further, the support member 148 could be reciprocated along both axis, as opposed to only one axis.

Referring now to FIG. 6a, the slides can have fiduciary features or marks associated therewith to assist in accurate positioning thereof In one such embodiment of fiduciary features, each of the slides has associated therewith a fiduciary hole 151, which is disposed on the securing mechanism 128. The fiduciary hole 151, when the gripping mechanism 122 is disposed within the support member 148, is operable to be lined up with a hole 153. A photoelectric diode 155 is disposed on one side of the member 148 and a detector 157 is disposed on the other side of the support member 148. The photoelectric diode 155 and detector 157 are disposed in a location such that when the base 138 is reciprocated along the rails 14, they will be brought into a location wherein the photoelectrode diode 155 and detector 157 will line up with the orifice comprised of the hole 153 and the hole 15 1. This will allow the slide to be positioned in the correct place and for the stepper motor 156 to make minor adjustments. As such, a reference "edge" can be defined for the storage operation. As long as the media sandwich structure 120 and gripping mechanism 122 are not moved relative to each other, this will be a repeatable operation.

Referring now to FIG. 7, there is illustrated a detail of one possible embodiment of the gripping arm for interfacing with the gripping member 124 of FIG. 4. The gripping member 124 in cross-section is a "T" shape extending outward from the structure 120 with two lateral protrusions 162 and 164 extending therefrom. However, the entire gripping member 124 is disposed within a recess 166 that is wider than the dimension between the most distal ends of the protrusions 162 and 164.

The gripping member 156 has disposed at the end thereof two sliding members 168 and 170, each having a glide slot 172 for reciprocating perpendicular to the movement of the reciprocating member 156. Two stops 174 and 176 are provided such that each of the members 168 and 170 can reciprocate outward therefrom the longitudinal axis of the member 156. Each of the members 168 and 170 have a gripping protrusion 180 and 182 for being disposed about the respective protrusions 164 and 162, respectively. These protrusions will move laterally outward such that they will be separated by a distance greater than the separation of the most distal ends of the protrusions 162 and 164 to allow the arm 156 to be inserted into the recess 166 or extracted from the recess 166.

In operation, a spring 184 is operable to bias the two protrusions 180 and 182 toward each other. In order to move the two protrusions 180 and 182 apart, a cam 188 rotated on a pivot 190 is operable to urge the two members 168 and 170 apart. In the resting position, a spring 194 is operable to bias the cam 180 in one position. An arm 196 is operable to rotate the cam 180 to urge the members 168 and 170 apart. The arm 196 is operable to be reciprocated in an open position (by a mechanism not shown) that will separate the two protrusions 180 and 182 upon reciprocation inward of the member 156 for the purpose of retrieving the slide and then remove it after the slide is retrieved and locked. Thereafter, the member 156 can be reciprocated against the gripping mechanism 122 and gripping member 124 to insert the slide back into the jacket 110.

Referring now to FIGS. 8a and 8b, there is illustrated an embodiment of the present invention. The slides are operable to retain information about past exposure history or storage utilization to help in maximizing their capacity. The embodiment of FIGS. 8a and 8b provides a non-volatile memory that is stored in conjunction with the gripping mechanism 122. A portion of the gripping mechanism 122 is illustrated in FIG. 8a. A substrate 198 is disposed internal to the gripping mechanism 122 and is operable to have a memory chip 200 disposed on the surface thereof. The memory chip 200 is a non-volatile memory that can be written to and read from, such as an EEPROM. These are conventional memories. The package 200 is either a J-lead package which comprises a surface mount device or it can be a "flip chip". These are conventional techniques utilized in such things as Smart Cards. The package 200 is disposed onto the surface of the substrate 198 and bonded thereto with a pattern of conductors defined thereon. The pattern of conductors extends outward into edge connectors 204, which are disposed on two sides of a protrusion 208 of the substrate 198. This extends outward from the gripping mechanism 122. As illustrated in FIG. 8b, the protrusion 208 is operable to be inserted into a socket 210 which is mounted on the slide support member 148 and which has a plurality of interfacing flexible contacts 214 associated therewith. The protrusion 208 is operable to be inserted into the socket 210 such that the flexible members 214 will interface with the edge conductors 204.

By utilizing a EEPROM 200, historical information about the media associated with the structure media 120 will be stored in conjunction with the media itself. Since the media is a Write-Once Read-Many structure, it is necessary to determine how much information is stored in a particular location. Further, the holographic storage media in the form of the photopolymer is a "depletable" resource, in that illumination of any storage region will result in the depletion of the constituents necessary to polymerize the material. As these constituents are depleted, the region will saturate and no further polymerization will be achievable. As such, it is necessary to know the history of the medium to know what regions are available. An alternate method is to actually write this information into predetermined regions of the media 120. Therefore, any retrieval operation will be followed with an update operation to determine the history of the media. Conversely, when the media is removed, the system will automatically write this information to the memory chip in the package 200, if not continually update the memory chip 200. Therefore, power down situations or system failures will not affect the historical information stored in the memory chip 200.

Referring now to FIG. 9, there is illustrated an alternate embodiment of the slide, which illustrates the preferred embodiment for the layout of the recorded information on the media. The slide of FIG. 9 is illustrated in a typical 35 mm configuration with a holder 220 that has an overall dimension of 51 mm square with a window 221 having a dimension of 37 mm×37 mm. A storage media 222 is provided that is contained within the window 221 and is similar to the structure 120. This will allow 1369 storage regions to be formed within the media and, therefore, 1369 stacks of pages. Each of the storage regions is approximately 1 mm in diameter, such that the distance between the centers thereof is approximately 1 mm. This will allow 37 storage regions to be disposed along each edge.

The slide of FIG. 9 is operable to be inserted in a conventional manner as a photographic slide is inserted. Typically, these are either pushed into place or dropped into place by gravity. A fiduciary mark 224 is provided which is a hole that provides for alignment of the structure as described above with reference to FIG. 6.

Referring now to FIG. 10, there is illustrated a beam intensity optimization pattern that is disposed on the surface of the structure 120. As described above, each of the storage regions is defined by a cylindrical volume. When a data beam 230 is directed toward the storage region 54, a reference beam 232 is also directed toward the storage region 54 to interfere with the data beam 230. Since the data beam at the storage region 54 represents the Fourier transform of the data image, this Fourier transform will be distributed across the media 10. The Fourier transform has an intense DC component at the center of the Storage region which does not carry information, and in a depletable resource such as exists with a photopolymer material, it would be desirable to suppress the DC component such that it does not use up the depletable polymerization resources of the recording media and, hence, the dynamic range in the linear region of the recording media. In order to reduce the DC component of the Fourier transform, a pattern is disposed on the surface of the capping layer 51, which has an absorption profile 238 that has maximum absorption in the center of the storage region 54 and a decreasing absorption as it extends therefrom. As such, the dark absorption pattern in the center thereof is aligned with the DC component of the Fourier transform such that more optimum use can be made of the dynamic range. This is to be compared with traditional approaches wherein beam balances control upstream of the media by utilizing various filters while the intensity profile may be adjusted by distorting lenses or gratings for "top hat" filters. These, of course, increase the complexity of the system. Although the absorption pattern is illustrated as attenuating the DC component at the center of the storage region, it should be understood that any portion of the beam can be absorbed.

Referring now to FIGS. 11a–11d, there is illustrated one possible process for forming the pattern 238. Initially, the sandwich structure of the layers 49, 47 and 51, illustrated in FIG. 2, has a thin layer 240 of absorptive material such as aluminum deposited thereon to a thickness of approximately 100–300 Å. This can be deposited by sputtering techniques or any type of deposition technique which utilizes relatively low temperatures that are compatible with the photopolymer material. After depositing the layer 240, a layer of photoresist is disposed thereon and patterned to form a plurality of relatively small photoresist spots 242, as illustrated in FIG. 11b. The underlying aluminum layer 240 is then etched and then the photoresist 242 is removed to yield a plurality of "dots" of aluminum 244 on the surface of the capping layer 51. This is illustrated in FIG. 11c. FIG. 11d illustrates a detail of the "dots" 244 on the capping layer 51 after some additional processing. It can be seen that the entire etching process will result in a domed shaped structure, which will require additional etching steps well known in the art. As a result, the light at the center of the dot 244 will be absorbed more than that toward the edge of the dot.

Referring now to FIGS. 12a–12c, there is illustrated a pattern wherein the intensity profile of the Fourier transform of the data beam 230 is illustrated in FIG. 12a and the absorptive characteristics of the dots 244 as illustrated in FIG. 12b. It can be seen that the absorptive pattern is disposed in substantially the center of the storage region that is aligned with the DC component of the Fourier transform of the data beam 230. This maximum absorption of the pattern of FIG. 12b is disposed over a small portion of the surface, for example, approximately 1% of the total storage region surface, indicated by boundaries 500 and 501 on either side of the profiles in FIG. 12b. The resultant 500 and 501 intensity profile is illustrated in FIG. 12c, wherein it can be seen that the DC component is substantially reduced. Therefore, the intensity of the DC component will be minimized and, as such, the amount of polymerization occurring due to this will be reduced.

In summary, there has been provided a packaging technique for a holographic storage media wherein the holographic storage media is packaged in a sandwich structure which is disposed in a slide. The slide is operable to be disposed in an opaque casing such that a plurality of packaged slides can be disposed in a slide tray. The slide tray can be operated to move in a reciprocal manner to allow individual slides to be presented to a picking mechanism that will extract the slide and dispose it in a slide tray. The slide tray is then operable to be disposed in the holographic storage system to allow a data beam and a reference beam to be directed to selected storage locations in the media. After the storage media has been written to or read from, the slide can be inserted back into the associated case in the slide tray and another slide selected. Further, the slide carrier can have fiduciary features to assist in the precise alignment of the media relative to the optics. Also, this slide carrier can carry information about the exposure history and data recording history relative to that particular piece of media.

Although the preferred embodiment has been described in detail, it should be understood that various changes, substitutions and alterations can be made therein without departing from the spirit and scope of the invention as defined by the appended claims.

What is claimed is:

1. A package structure for a holographic storage media, comprising:

an optically transmissive substrate;

a media layer of photosensitive holographic data storage material disposed on said substrate;

an optically transmissive capping layer disposed on the surface of said media opposite said substrate;

said substrate, said media layer and said capping layer forming a slide having a plurality of storage locations formed within said media layer for storing holographic recordings of the Fourier transform of a data image;

an opaque jacket containing said slide with one end open to allow said slide to be removed therefrom for reading of information therefrom and writing of information thereto, and for inserting of said slide back into said jacket; and a gripping mechanism integrated with the edge of said slide proximate to said opening when said slide is inserted into said jacket, said gripping mechanism operable to be interfaced with an external mechanism for attaching to said gripping mechanism to allow said slide to be pulled out of said jacket and to be inserted into said jacket.

2. The package structure of claim 1, and further comprising a plurality of slides and a slide tray for containing said slides disposed in a parallel relationship with the ends of each of said slides extending outward from said slide tray, said slide tray having associated with each of said slides a retaining mechanism for retaining said jacket within said slide tray such that said slide can be removed from said jacket without removing said jacket from said slide tray, said slide tray operable to be automatically positioned to present said opening of each of said jackets to an extracting mechanism.

3. The package structure of claim 1, wherein said slide has a support structure disposed about the periphery of said slide.

4. The package structure of claim 1, and further comprising a fiduciary alignment mark disposed proximate to said slide and fixed relative thereto such that when said slide is moved relative to said jacket, said fiduciary mark moves with said slide, said fiduciary mark operable to allow a storage location within said media layer to be aligned relative to an external holographic system to allow a light beam to be directed at said storage region.

5. The package structure of claim 1, and further comprising a non-volatile storage medium associated with said slide for storing unique information associated with said slide.

6. The package structure of claim 1, wherein said media layer is comprised of a photopolymer material.

7. A holographic storage system, comprising:

a portable holographic storage media, said portable holographic storage media having:
        an optically transmissive substrate,
        a media layer of photosensitive photopolymer material disposed on said substrate,
        an optically transmissive cupping layer disposed on the surface of said media opposite said substrate,
        said substrate, said media layer and said cupping layer forming a slide having a plurality of storage locations formed within said media layer for storing holographic recordings of the Fourier transform of a data image, and
        an opaque jacket containing said slide with one end open to allow said slide to be removed therefrom for reading of information therefrom and writing of information thereto, and for inserting of said slide back into said jacket;

a beam generation system for generating a data beam and a reference beam, the data beam having a data image encoded therein that represents digital data;

a slide holder;

a slide retrieval system for retrieving the slide from said jacket and disposing it in the slide holder, said slide retrieval system operable in the reverse operation to remove said slide from said slide holder and dispose it in said associated jacket;

a beam positioning system for positioning said data beam and said reference beam onto a select one of said storage locations when said slide is disposed in said slide holder;

a detection device for detecting data from a reconstructed data beam during a playback operation; and a system controller for controlling said beam positioning system to position said data beam and said reference beam to said select location in response to an external addressing signal, and controlling said beam generation system to generate said data beam and said reference beam during a record operation, and only said reference beam during a playback operation, such that a reconstructed data beam is generated for detection by said detection device during a playback operation.

8. The holographic storage system of claim 7, wherein said beam positioning system is operable to control said slide holder to move said slide and said slide holder along at least one axis of said slide.

9. The holographic storage system of claim 7, wherein said beam positioning system includes beam positioning optics operable to position said data beam and reference beam along at least one axis of said slide.

10. The holographic storage system of claim 7, and further comprising a plurality of said portable holographic storage media and a slide tray for containing said plurality of portable holographic storage media in a predetermined order and a selection device for selecting the one of said portable holographic storage media accessible by said slide retrieval system.

11. The holographic storage system of claim 10, wherein said portable holographic storage media are arranged in a parallel configuration in said slide tray and said selection device comprises a drive mechanism for moving said slide tray along an axis perpendicular to the plane of said jacket, to place the select one of said portable holographic storage media in the plane of movement of said slide retrieval system and in the plane of said slide holder.

12. The holographic storage system of claim 7, wherein said slide has a gripping member disposed on the edge thereof proximate to the opening in said jacket when said slide is disposed in said jacket, said gripping member operable to interface with said slide retrieval system.

13. The holographic storage system of claim 7, wherein said slide has disposed thereon a fiduciary positioning mark, and wherein said slide retrieval system further includes a positioning system for positioning said slide relative to said beam positioning system such that said fiduciary mark is in a predetermined relative location to said beam positioning system prior to activation of said beam positioning system.

14. The holographic storage system of claim 7, wherein said beam positioning system further includes an angle multiplexing system for varying the angle of said reference beam relative to the surface of said slide for each of said storage locations, the angle determined by said angle multiplexing system determined by an external address signal.

15. The holographic storage system of claim 7, and further comprising:

a non-volatile storage device integrally associated with said slide; and a non-volatile memory access device for accessing said non-volatile memory device when said slide is disposed in said slide holder;

said non-volatile memory operable to contain information unique to said media layer associated with said associated slide.

16. A holographic storage system, comprising:

a portable holographic storage media, said portable holographic storage media having:
 a slide having associated therewith a photosensitive holographic storage media, the storage media having a plurality of storage locations formed therein for storing holographic recordings of the Fourier transform of a data image, and
 an opaque jacket containing said slide with one end open to allow said slide to be removed therefrom for reading of information therefrom and writing of information thereto, and for inserting of said slide back into said jacket;

a beam generation system for generating a data beam and a reference beam, the data beam having a data image encoded therein that represents digital data;

a slide holder;

a slide retrieval system for retrieving the slide from said jacket and disposing it in the slide holder, said slide retrieval system operable in the reverse operation to remove said slide from said slide holder and dispose it in said associated jacket;

a beam positioning system for positioning said data beam and said reference beam onto a select one of said storage locations when said slide is disposed in said slide holder;

a detection device for detecting data from a reconstructed data beam during a playback operation; and a system controller for controlling said beam positioning system to position said data beam and said reference beam to said select location in response to an external addressing signal, and controlling said beam generation system to generate said data beam and said reference beam during a record operation, and only said reference beam during a playback operation, such that a reconstructed data beam is generated for detection by said detection device during a playback operation.

17. The holographic storage system of claim 16, wherein said slide has disposed thereon a fiduciary positioning mark, and wherein said slide retrieval system further includes a positioning system for positioning said slide relative to said beam positioning system such that said fiduciary mark is in a predetermined relative location to said beam positioning system prior to activation of said beam positioning system.

18. The holographic storage system of claim 16, wherein said beam positioning system further includes an angle multiplexing system for varying the angle of said reference beam relative to the surface of said slide for each of said storage locations, the angle determined by said angle multiplexing system determined by an external address signal.

19. The holographic storage system of claim 16, and further comprising:

a non-volatile storage device integrally associated with said slide; and a non-volatile memory access device for accessing said non-volatile memory device when said slide is disposed in said slide holder;

said non-volatile memory operable to contain information unique to said media layer associated with said associated slide.

20. A package structure for a holographic storage media, comprising:

an optically transmissive substrate;

a media layer of photosensitive holographic data storage material disposed on said substrate;

an optically transmissive capping layer disposed on the surface of said media opposite said substrate;

said substrate, said media layer and said capping layer forming a slide having a plurality of storage locations formed within said media layer for storing holographic recordings of the Fourier transform of a data image;

an opaque jacket containing said slide with one end open to allow said slide to be removed therefrom for reading of information therefrom and writing of information thereto, and for inserting of said slide back into said jacket; and a fiduciary alignment mark disposed proximate to said slide and fixed relative thereto such that when said slide is moved relative to said jacket, said fiduciary mark moves with said slide, said fiduciary mark operable to allow a storage location within said media layer to be aligned relative to an external holographic system to allow a light beam to be directed at said storage region.

21. The package structure of claim 20, and further comprising a gripping mechanism integrated with the edge of said slide proximate to said opening when said slide is inserted into said jacket, said gripping mechanism operable to be interfaced with an external mechanism for attaching to said gripping mechanism to allow said slide to be pulled out of said jacket and to be inserted into said jacket.

22. The package structure of claim 20, and further comprising a plurality of slides and a slide tray for containing said slides disposed in a parallel relationship with the ends of each of said slides extending outward from said slide tray, said slide tray having associated with each of said slides a retaining mechanism for retaining said jacket within said slide tray such that said slide can be removed from said jacket without removing said jacket from said slide tray, said slide tray operable to be automatically positioned to present said opening of each of said jackets to an extracting mechanism.

23. The package structure of claim 20, wherein said slide has a support structure disposed about the periphery of said slide.

24. The package structure of claim 20, and further comprising a non-volatile storage medium associated with said slide for storing unique information associated with said slide.

25. The package structure of claim 20, wherein said media layer is comprised of a photopolymer material.

\* \* \* \* \*

UNITED STATES PATENT AND TRADEMARK OFFICE
CERTIFICATE OF CORRECTION

PATENT NO. : 5,488,494
DATED : January 30, 1996
INVENTOR(S) : Redfield, et al.

It is certified that error appears in the above-indentified patent and that said Letters Patent is hereby corrected as shown below:

Column 1, line 60, replace "carder" with --carrier--.

Column 3, line 66, replace "carder" with --carrier--.

Column 4, line 32, replace "(>4" with --64--.

Column 5, line 10, replace "reddirected" with --redirected--.

Column 7, line 21, replace "carder" with --carrier--.

Column 7, line 41, replace "carder" with --carrier--.

Column 12, Claim 7, line 22, replace "cupping" with --capping--.

Signed and Sealed this

Ninth Day of July, 1996

*Attest:*

BRUCE LEHMAN

*Attesting Officer*  *Commissioner of Patents and Trademarks*